US 6,832,431 B2

(12) United States Patent
Bloch et al.

(10) Patent No.: US 6,832,431 B2
(45) Date of Patent: Dec. 21, 2004

(54) FASTENER CATCHING AND INSTALLATION TOOL

(75) Inventors: Daniel D. Bloch, St. Peters, MO (US); David L. Fritsche, Foristell, MO (US)

(73) Assignee: The Boeing Company, Chicago, IL (US)

( * ) Notice: Subject to any disclaimer, the term of this patent is extended or adjusted under 35 U.S.C. 154(b) by 70 days.

(21) Appl. No.: 10/407,024

(22) Filed: Apr. 3, 2003

(65) Prior Publication Data

US 2004/0194283 A1 Oct. 7, 2004

(51) Int. Cl.[7] .......................... B23P 17/00; B23P 21/00; B23P 11/00
(52) U.S. Cl. .................. 29/525.01; 29/715; 29/243.523
(58) Field of Search .............................. 29/525.01, 428, 29/812.5, 816, 818, 700, 714, 715, 243.522, 243.523; 227/119, 112

(56) References Cited

U.S. PATENT DOCUMENTS

| | | | |
|---|---|---|---|
| 4,577,794 A | * | 3/1986 | Armstrong et al. ......... 227/119 |
| 4,901,431 A | | 2/1990 | Gast |
| 5,697,137 A | | 12/1997 | Frearson et al. |

OTHER PUBLICATIONS

LeCann, Raymond P., "Automated Support of Manual Fastening Operations" SAE Aerospace Automated Fastening Conference, Sep. 10–14, 2001, SAE Technical Paper Series, 2001–01–2572.

* cited by examiner

Primary Examiner—John C. Hong
(74) Attorney, Agent, or Firm—Harness Dickey & Pierce P.L.C.

(57) ABSTRACT

A fastener catching and installation tool is provided that comprises a guide tube, a slide device, a translating device, and a pivot frame disposed on a frame. Further, catching fingers are disposed within the pivot frame, a slide device activation member is coupled to the slide device, and a translating device activation member is coupled to the translating device. In operation, a fastener is delivered through the guide tube and to the catching fingers, the slide device activation member activates the slide device to slide the pivot frame and the catching fingers proximate a workpiece, and the translating device activation member activates the translating device to insert the fastener into the workpiece. Additionally, the catching fingers are pivotably retained in the tool and comprise first and second catching fingers that define a tapered bore and opposed slots to properly position and catch a plurality of fastener sizes.

33 Claims, 8 Drawing Sheets

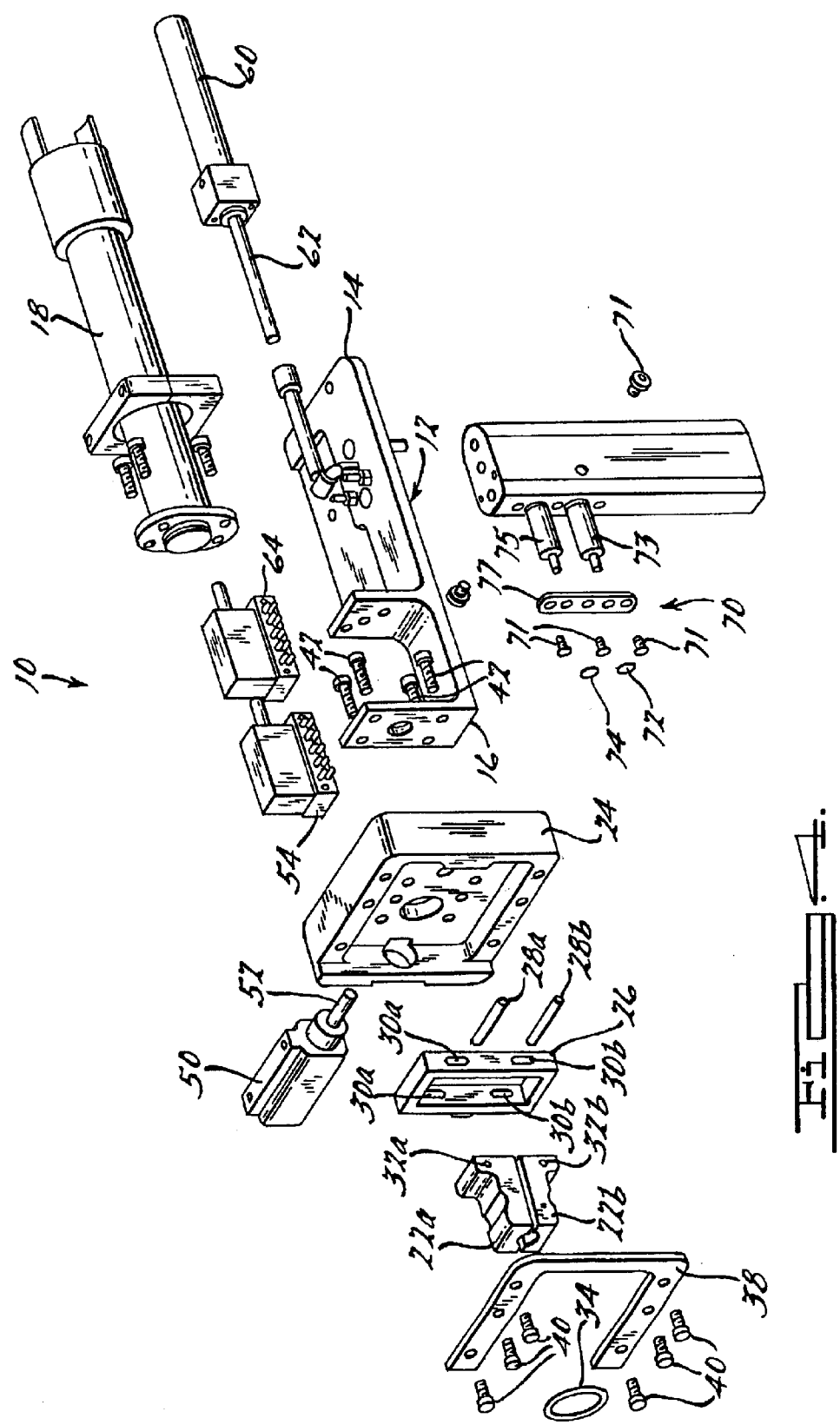

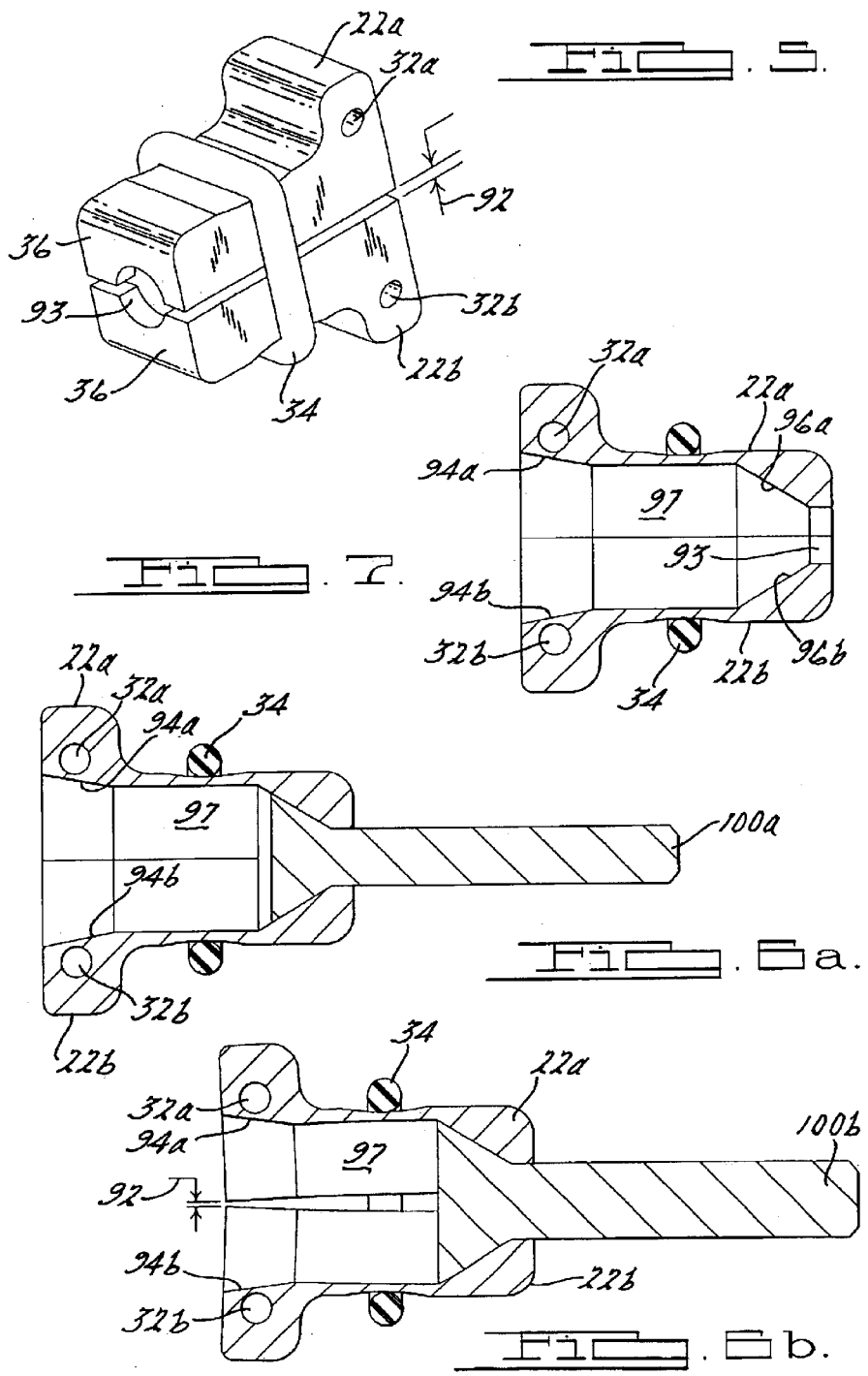

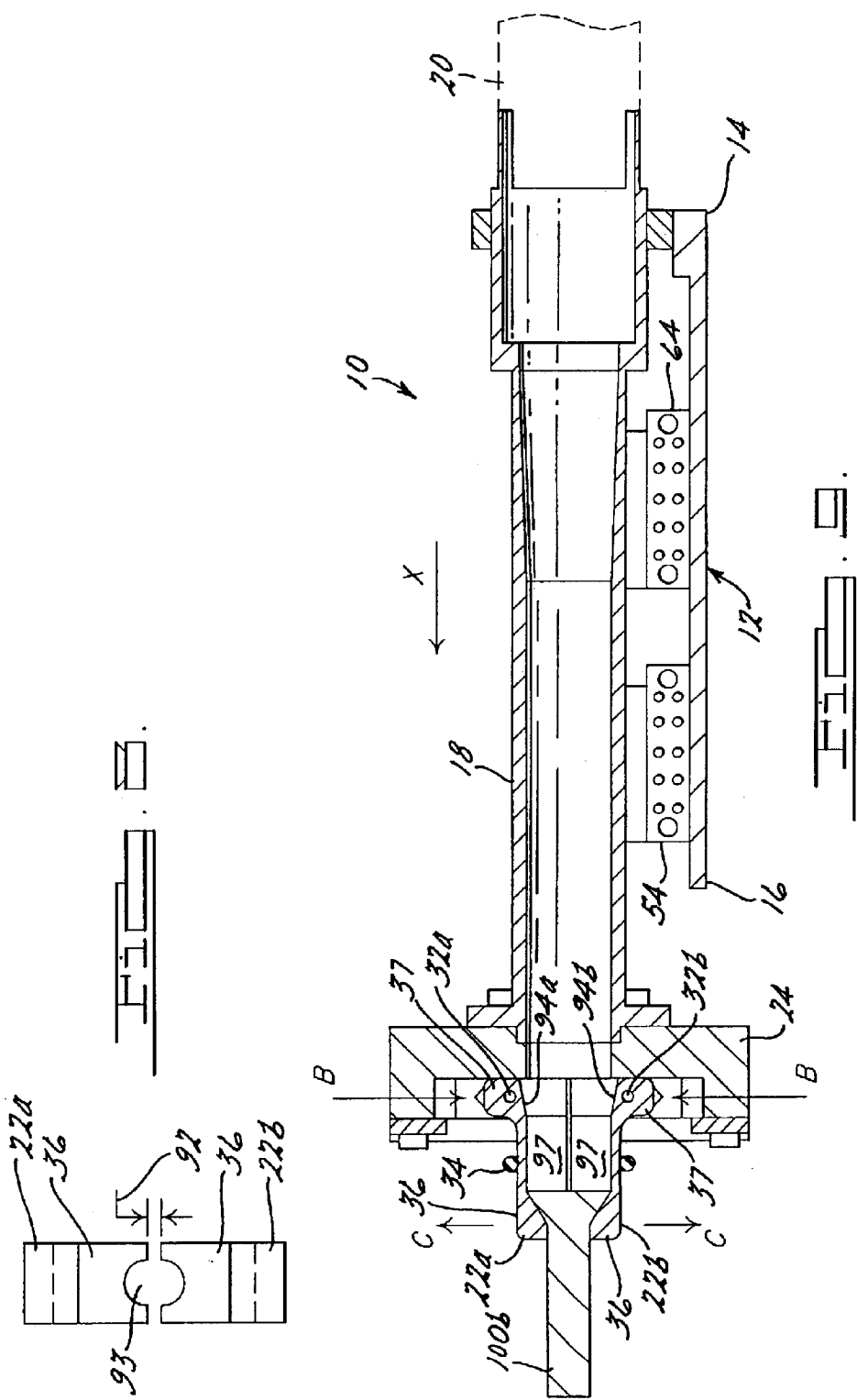

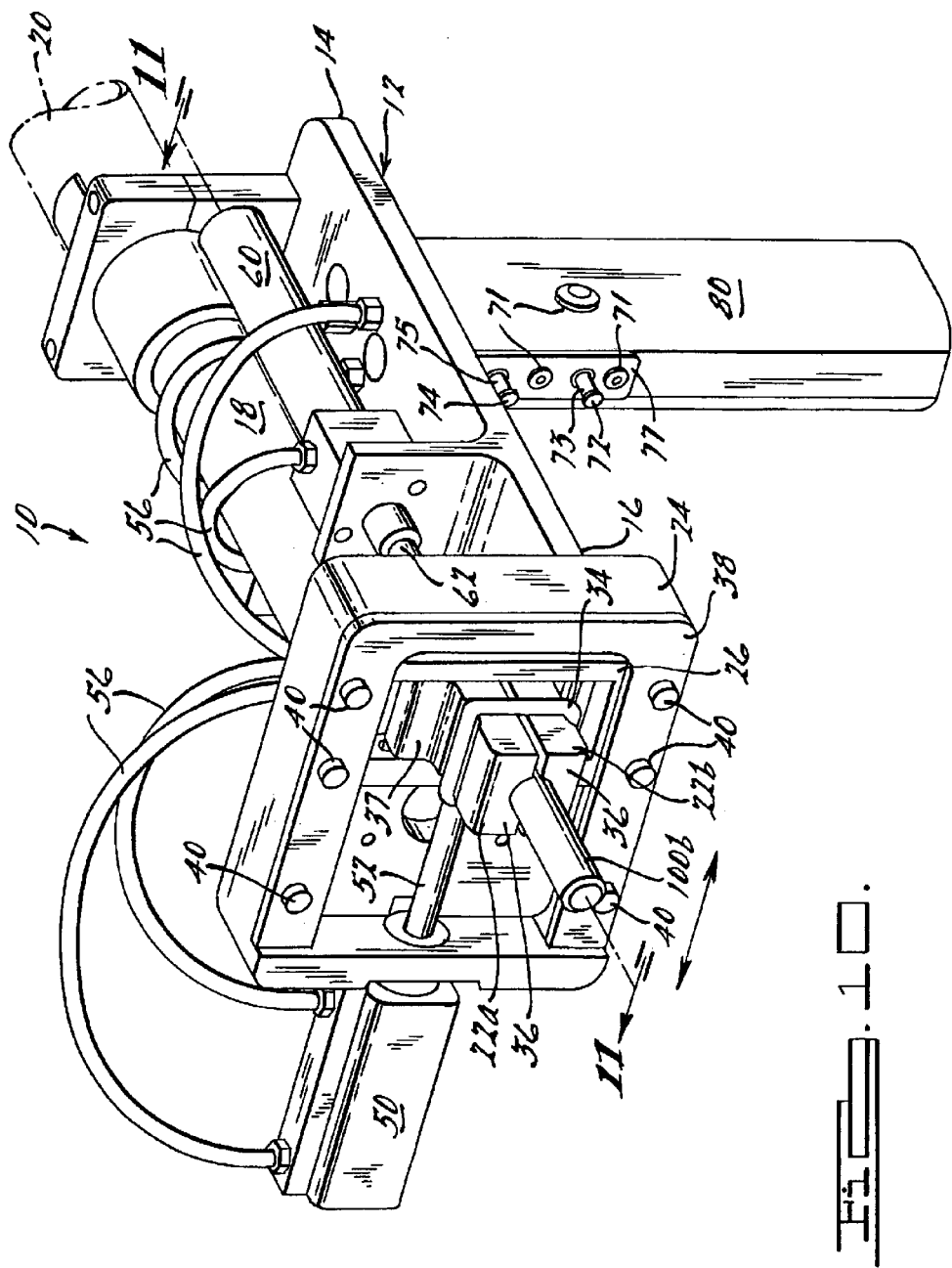

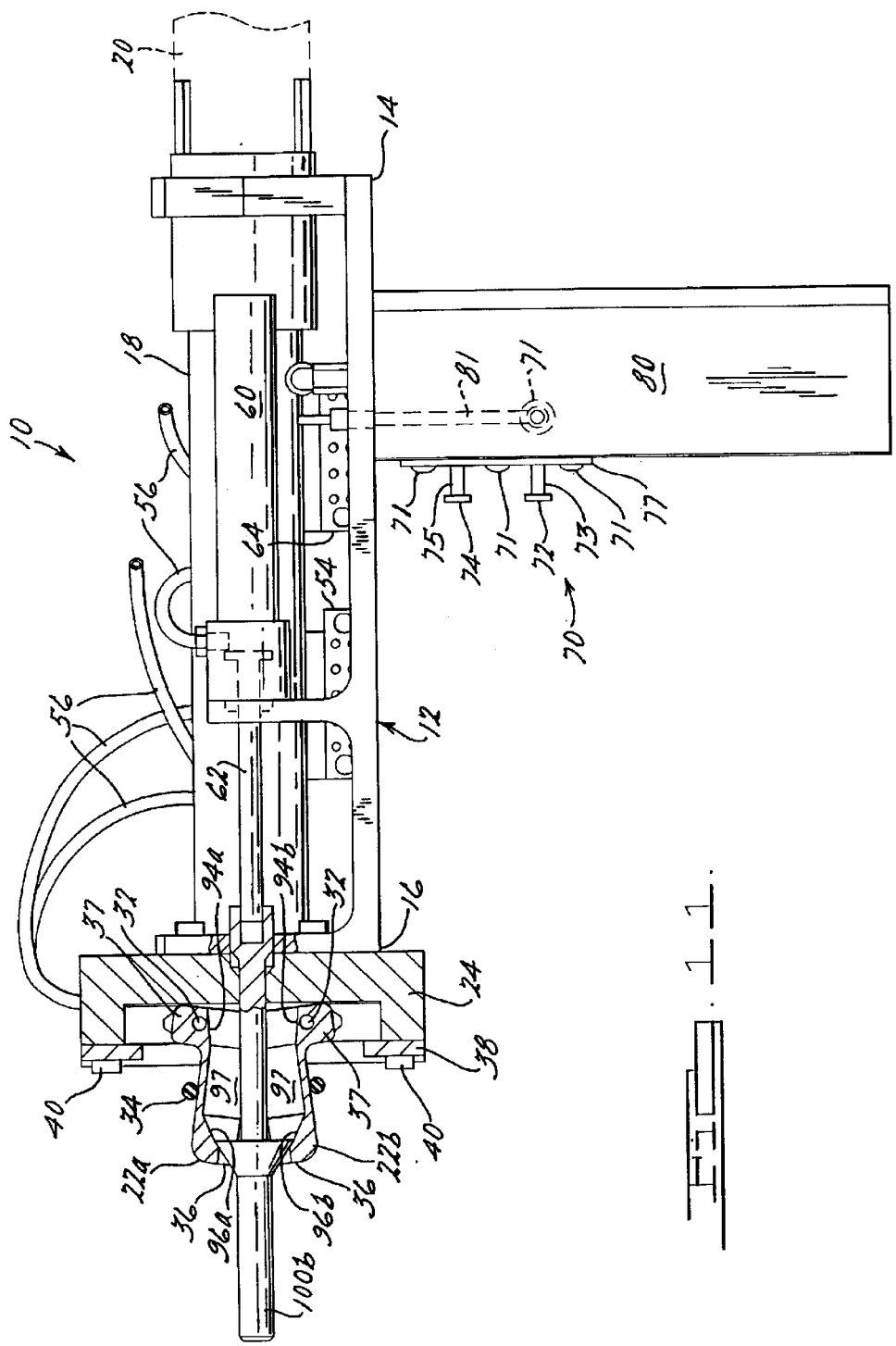

FASTENER CATCHING AND INSTALLATION TOOL

FIELD OF THE INVENTION

The present invention relates generally to mechanized fastening equipment and more particularly to equipment that receives and positions fasteners for installation into a workpiece.

BACKGROUND OF THE INVENTION

Manufacturing equipment that automatically delivers fasteners to a workpiece, or a fastening device, is typically employed in high rate production environments. The equipment generally comprises a storage device for the fasteners and a mechanism or system that transports fasteners from the storage device to the workpiece or fastening device. For example, U.S. Pat. No. 5,588,554 to Jones, the contents of which are incorporated herein by reference in their entirety, discloses a device for delivering fasteners to a workpiece comprising a suction head that removes fasteners from a storage area and delivers the fasteners through a delivery tube using a vacuum. The fasteners are individually stored in holes of a predetermined or fixed depth, and only one fastener may be stored in any given hole. Accordingly, each hole contains a fastener of a specific configuration, diameter, and grip length. Moreover, the device of Jones is incorporated in a relatively large assembly system that is permanently installed at a fixed location within a production facility.

Yet another known art fastener delivery system is disclosed in U.S. Pat. No. 5,193,717 to Rink et al., wherein rivet cartridges are unloaded and rivets are delivered to a rivet machine or the like with pressurized air. The rivet cartridges are filled off line by a rivet pump that receives rivets from a vibrating bowl feeder, and the fasteners are delivered through a common passageway to a fastener installation tool. However, the fastener delivery system of Rink et al. requires a separate fastener escapement mechanism to remove and deliver the fasteners. Additionally, the fastener delivery system of Rink is mounted to a fixed base plate and is therefore not mobile or portable.

Unfortunately, automated fastener delivery equipment of the known art is substantially large in size and must be permanently installed into the flooring and existing structure of a manufacturing facility. Typically, a large assembly jig is mounted to a floor and consumes a substantial volume within a manufacturing facility. Furthermore, the parts or components that are being assembled must be positioned with tooling located within a working envelope of the automated fastener delivery equipment, which may also consume a substantial volume. Accordingly, the automated fastener delivery equipment of the known art is not portable and cannot be moved from work station to work station in order to deliver fasteners to a variety of assemblies and subassemblies.

In the production assembly of aircraft, the majority of substructure such as fuselage frames and longerons, along with wing spars and ribs, are joined to the skin of the aircraft with thousands of fasteners. Further, a plurality of fastener types, along with variations in diameters and grip lengths, are typically used in an aircraft assembly or subassembly. (Generally, a fastener grip length refers to the cumulative thickness of the parts that the fastener holds together). Moreover, a majority of the substructure parts are manually assembled and are not assembled using automated fastening equipment.

During manual assembly operations, an operator must first determine the appropriate fastener type and diameter from a blueprint or other manufacturing work instruction delivery system. Due to manufacturing variations in individual part fabrication and assembly positioning variations, the proper grip length of the fastener is often determined by manually measuring hole depths. Once the proper fastener configuration is determined, the fastener stock must then be located and selected from fastener bins, which are typically stored at a common location near the work station. A limited number of fasteners are then moved by hand from the fastener bins to the work station and are generally staged within the reach of an operator. If permitted by the work environment, several fasteners are stored in a pouch that is secured around the waist of an operator. Accordingly, the operator sorts through the fasteners to select the proper configuration and inserts the fastener directly into a hole through the parts or inserts the fastener into an installation tool that installs the fastener through the parts.

As a result, a significant amount of time is spent by an operator determining the proper fastener configuration, locating the fastener within a storage bin, and transporting the fastener to the work station for installation. Thus making manual fastener installation very time consuming. Therefore, it is desirable to have a fastener system which portable and automated.

One portable device has been developed by the applicant in U.S. Patent Application titled "Portable Automatic Fastener Delivery System," Ser. No. 09/931,501 filed Aug. 16, 2001, the contents of which are incorporated herein by reference in their entirety. The portable device delivers a plurality of different fastener types and sizes on request to an operator, and the operator then manually orients the fastener properly and inserts the fastener into a workpiece for subsequent installation.

Accordingly, a need remains in the art for a device that catches fasteners from an automatic fastener delivery system and that properly orients the fasteners for installation into a workpiece. A further need exists for such a device that inserts the fasteners into the workpiece for subsequent installation.

SUMMARY OF THE INVENTION

In one preferred form, the present invention provides a fastener catching and installation tool that comprises a frame defining a proximal end and a distal end. A guide tube is disposed along the frame, and a pivot frame is disposed at the distal end of the frame, wherein a slide device is coupled to the pivot frame and catching fingers are disposed within the pivot frame. Further, a slide device activation member is disposed on the frame and is coupled to the slide device. A translating device is disposed along the frame, and a translating device activation member is disposed on the frame and is coupled to the translating device. In operation, a fastener is delivered through the guide tube and into the catching fingers. The slide device activation member activates the slide device to slide the pivot frame and the catching fingers proximate a workpiece, and the translating device activation member activates the translating device to insert the fastener into the workpiece.

Additionally, the fastener catching and installation tool further comprises a handle disposed at the proximal end of the frame. A first trigger button is disposed on the handle to operate the slide device activation member, and a second trigger button is disposed on the handle to operate the translating device activation member. Preferably, an air supply is provided to the fastener catching and installation tool such that the slide device and the translating device are pneumatically operated by the air supply. Further, the slide device and the translating device are preferably air cylinders and the slide device activation member and the translating device activation member are preferably air control valves. Accordingly, the first trigger button opens one of the air control valves to activate the slide device, which positions the fastener proximate a workpiece, and the second trigger button opens the other air control valve to activate the translating device to insert the fastener into the workpiece.

In another form, a fastener catching device is provided that comprises a first catching finger, a second catching finger disposed adjacent the first catching finger, and at least one retaining member that maintains positions of the first catching finger and the second catching finger relative to each other. The catching fingers are pivotably mounted to the pivot frame and define a tapered bore and opposed slots to properly position and catch a plurality of fastener sizes.

In yet another form, a method of positioning and inserting a fastener into a workpiece is provided that comprises the steps of delivering a fastener through a guide tube and into catching fingers, activating a slide device to slide the catching fingers proximate a workpiece, and activating a translating device to insert the fastener into the workpiece. Additionally, a method of catching the fastener is provided that comprises the steps of delivering a fastener into a tapered bore of catching fingers, guiding the fastener through the catching fingers with the tapered bore, and catching the fastener against distal internal shoulders of the catching fingers.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is an exploded view of the fastener catching and installation tool constructed in accordance with the teachings of the present invention;

FIG. 5 is a perspective view of catching fingers constructed in accordance with the teachings of the present invention;

FIG. 6a is a cross-sectional side view of a fastener disposed within catching fingers in accordance with the teachings of the present invention;

FIG. 6b is a cross-sectional side view of a larger fastener disposed within the catching fingers in accordance with the teachings of the present invention;

FIG. 7 is a cross-sectional side view of catching fingers constructed in accordance with the teachings of the present invention FIG. 8 is a front view of the catching fingers in accordance with the principles of the present invention;

FIG. 9 is a cross-sectional side view of a fastener catching and installation tool with a fastener disposed between catching fingers in accordance with the teachings of the present invention;

FIG. 10 is a perspective view of the fastener catching and installation tool with the catching fingers disposed proximate the translating device and constructed in accordance with the teachings of the present invention; and FIG. 11 is a cross-sectional side view of a fastener catching and installation tool with a translating device engaging a fastener within catching fingers for installation into a workpiece.

DETAILED DESCRIPTION OF THE PREFERRED EMBODIMENTS

The following description of the preferred embodiments is merely exemplary in nature and is in no way intended to limit the invention, its application, or uses.

Figure 1:
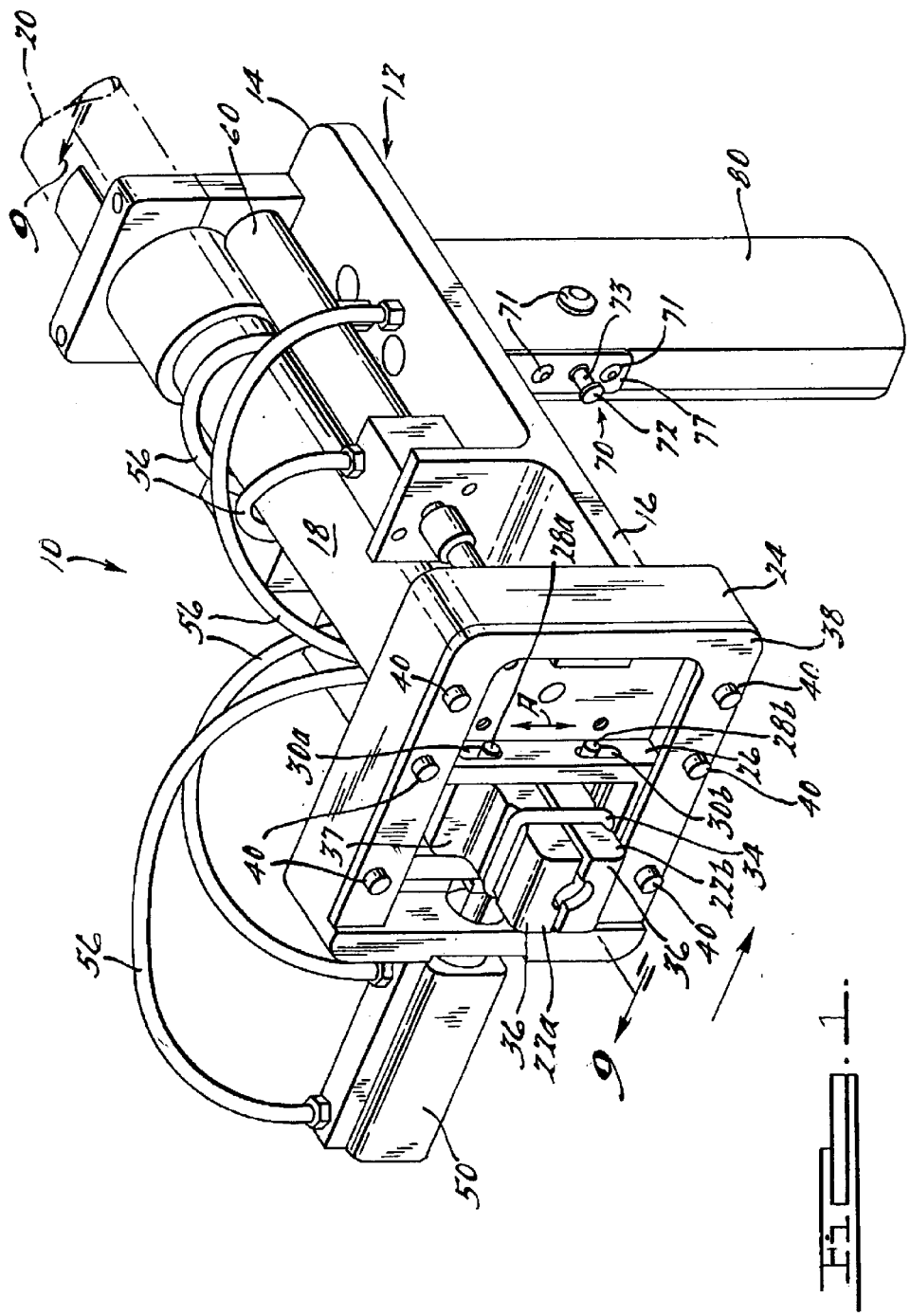
FIG. 1 is a perspective view of a fastener catching and installation tool constructed in accordance with the teachings of the present invention.

Referring to FIG. 1, a fastener catching and installation tool according to the present invention is illustrated and generally indicated by reference numeral 10 in FIGS. 1 through 4. The fastener catching and installation tool 10 generally comprises a frame 12 defining a proximal end 14 and a distal end 16. A guide tube 18 is disposed along the frame 12, between the proximal end 14 and the distal end 16 as shown, and the guide tube 18 is in communication with a supply of fasteners that enter the guide tube 18 near the proximal end 14. Preferably, the fasteners are supplied through a fastener delivery tube 20 as shown and described in copending application titled "Portable Automatic Fastener Delivery System," Ser. No. 09/931,501 filed Aug. 16, 2001, the contents of which are incorporated herein by reference in their entirety. Accordingly, the fasteners are supplied pneumatically by an air supply, although other methods commonly known in the art such as by using a fluid or other mechanical means may also be employed while remaining within the scope of the present invention.

As further shown, the guide tube 18 is in operative engagement with catching fingers 22a, 22b, wherein a fastener (not shown) is transported through the guide tube 18 and into the catching fingers 22a, 22b, which catch and position the fastener for installation as described in greater detail below. The catching fingers 22a, 22b are disposed within a slide frame 24, which is disposed at the distal end 16 of the frame 12. Further, the catching fingers 22a, 22b are pivotably mounted within a pivot frame 26 using pivot pins 28a, 28b. As best shown in FIG. 4, the pivot pins 28a, 28b are disposed within slots 30a, 30b formed in the pivot frame 26 and holes 32a, 32b formed in the catching fingers 22a, 22b, respectively. Accordingly, as shown in FIG. 1, the catching fingers 22a, 22b may be translated in the direction of arrow A within the slots 30a, 30b. Specifically, as a fastener is pushed towards the distal end 36, the catching fingers 22a, 22b translate in the direction of arrow A. Preferably, translation of the catching fingers 22a, 22b is limited through the use of one or more resilient members 34, which is a flexible o-ring in one form of the present invention. As shown, the resilient member 34 is disposed around a distal end 36 of the catching fingers 22a, 22b and thus limits the translation of the catching fingers 22a, 22b near the distal end 36.

Figure 2:
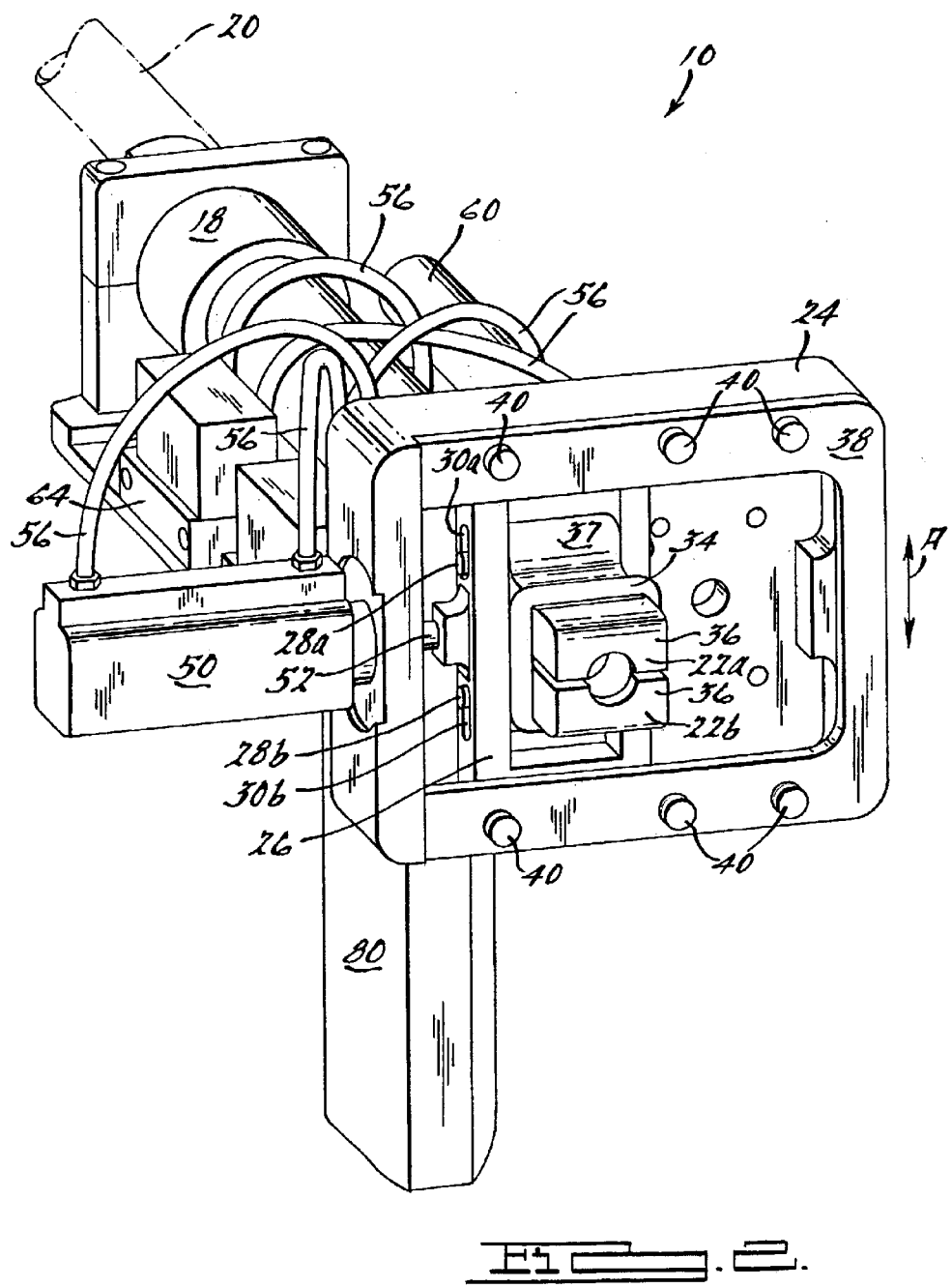
FIG. 2 is a perspective view of the fastener catching and installation tool constructed in accordance with the teachings of the present invention.
Figure 3:
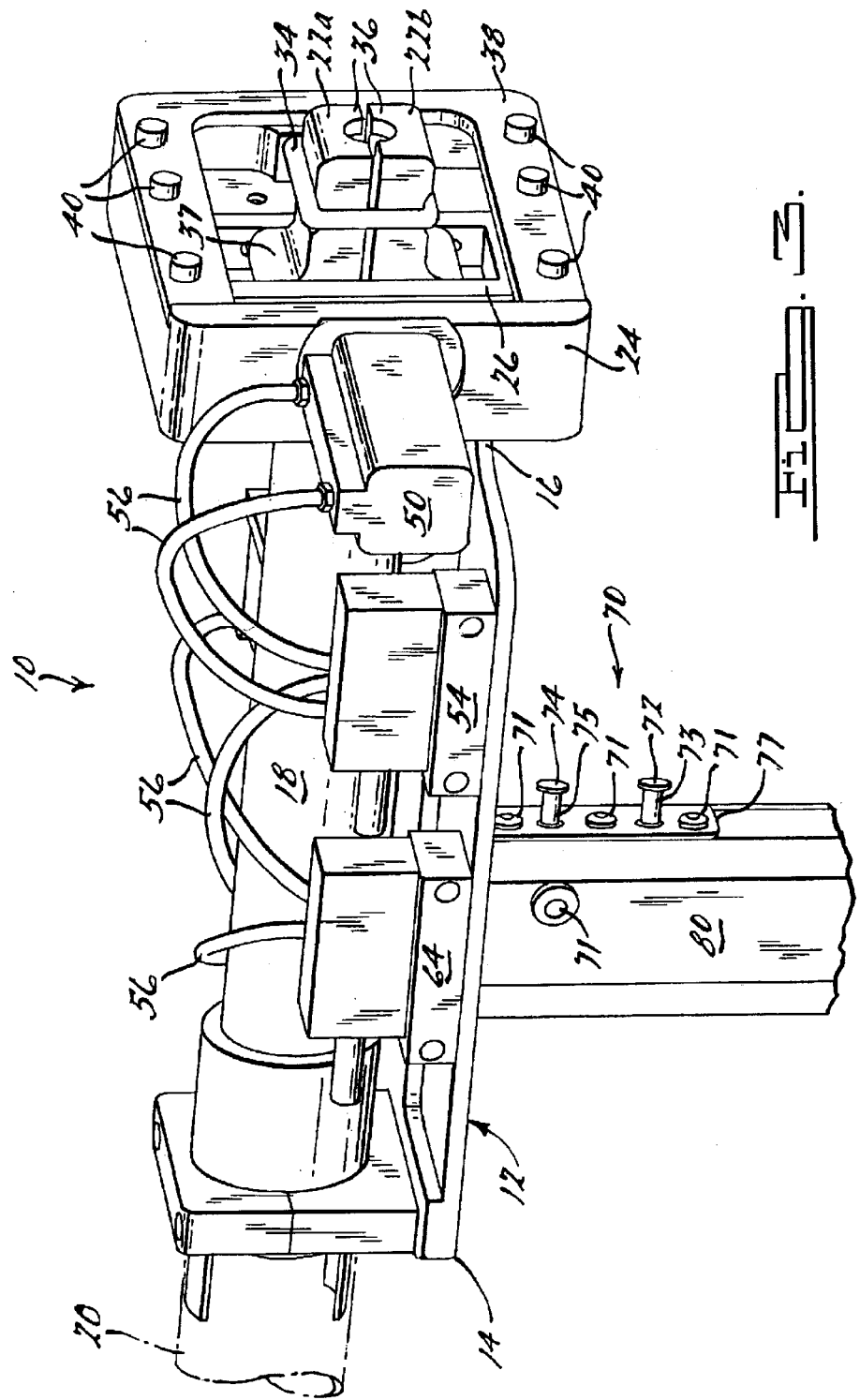
FIG. 3 is a perspective view of the fastener catching and installation tool constructed in accordance with the teachings of the present invention.

The pivot frame 26 is held within the slide frame 24 using a retaining member 38 as shown, which is preferably mechanically attached to the slide frame using cap screws 40. Similarly, the slide frame 24 is preferably mechanically attached to the distal end 16 of the frame 12 using bolts 42 as shown in FIG. 4. In one form, the frame 12, the slide frame 24, the retaining member 38, and the catching fingers 22a, 22b are preferably fabricated from Delrine®, and the pivot frame 26 is fabricated from steel. However, other materials and combination of materials such as aluminum, plastics, or fiber reinforced plastics, among others, may also be employed while remaining within the scope of the present invention, As further shown, the fastener catching and installation tool 10 comprises a slide device 50 coupled to the slide frame 24, wherein an actuator 52 engages the pivot frame 26 in operation as described in greater detail below. The slide device 50 is operated through a slide device activation member 54, wherein the slide device 50 is preferably an air cylinder and the slide device activation member 54 is preferably an air valve. Accordingly, air hoses 56 are used to supply air to and from the slide device activation member 54 and the slide device 50 in one form of the present invention as shown in FIGS. 1, 2 and 3. The air that is supplied through the air hoses 56 is used to operate the actuator 52.

As best shown in FIG. 4, the fastener catching and installation tool 10 also comprises a translating device 60 disposed along the frame 12. The translating device 60 also has an actuator 62 which engages the fastener during operation. The translating device 60 is operated by a translating device activation member 64, wherein the translating device 60 is preferably an air cylinder and the translating device activation member 64 is preferably an air valve. Accordingly, air hoses 56 are used to supply air to and from the translating device activation member 64 and the translating device 60 in one form of the present invention. The air that is supplied through the air hoses 66 is thus used to operate the actuator 62 as described in greater detail below.

Both the slide device activation member 54 and the translating device activation member 64 are operated through a trigger system 70, which is best shown in FIG. 4. The trigger system 70 comprises a first trigger button 72 and a second trigger button 74, which open and close air valves 73 and 75, respectively, which are disposed within a handle 80 and secured by a plurality of fasteners 71, such as set screws, and a retaining plate 77. The first trigger button 72 is used to operate the slide device activation member 54, while the second trigger button 74 is used to operate the translating device activation member 64 as described in greater detail below. The use of the first trigger button 72 and the second trigger button 74 is intended to illustrate the preferred form of the present invention and should not be construed as limiting the scope of the present invention. For example, a single trigger button (not shown) could be used to operate both the slide device activation member 54 and the translating device activation member 64 while remaining within the scope of the present invention. Accordingly, use of terms "first" and "second" should not be construed as limiting the scope of the present invention. Additionally, a logic device (e.g., pneumatic, electronic) may be employed to sequence the air valves while remaining within the scope of the present invention.

Referring now to FIGS. 5, 6a, 6b and 7, the catching fingers 22a, 22b according to the present invention are configured to accommodate more than one fastener size. As shown, the catching fingers 22a, 22b are separated by a gap 92, which limits the translating motion of the catching fingers 22a, 22b as the catching fingers 22a, 22b abut at the distal end 36 when a fastener is inserted therein, which is best shown in FIG. 6a. Additionally, the catching fingers 22a, 22b define first tapered surfaces 94a and 94b, respectively, and second tapered surfaces 96a, 96b, respectively. The first and second tapered surfaces 94a, 94b, 96a, 96b guide the fastener into the catching fingers 22a, 22b in operation. As used hereinafter, the first and second tapered surfaces 94a, 94b, 96a, 96b define a tapered bore 97 within the catching fingers 22a, 22b as shown. As further shown in FIG. 6b, the gap 92 closes down to fit the smaller diameter fastener 100a and expands to fit the larger diameter fastener 100b. Accordingly, the catching fingers 22a, 22b can accommodate more than one fastener size.

The catching fingers 22a, 22b are preferably fabricated by first machining a single piece of material and cutting the single piece of material into two halves, which results in the gap 92. Further, a distal opening 93 is formed by preferably drilling a hole in the single piece of material prior to cutting the single piece of material into halves. Accordingly, when the catching fingers 22a, 22b are disposed proximate each other as shown in FIG. 8, the distal opening 93 defines a shape that is oblong rather than circular, which further enhances the ability of the catching fingers 22a, 22b to retain a fastener therebetween.

Referring to FIG. 9, in operation, a fastener 100b, for example, is first delivered through the fastener delivery tube 20 and into the guide tube 18. The fastener 100b further travels through the guide tube 18 in the direction of arrow X and into the catching fingers 22a, 22b as shown. As the fastener 100b enters the catching fingers 22a, 22b, the first and second tapered surfaces 94a, 94b, 96a, 96b guide the fastener 100b through the catching fingers, 22a, 22b, while the proximal end 37 of the fingers translate in the direction of arrows B and the distal end 36 of the catching fingers 22a, 22b translate in the direction of arrows C. As shown, translation of the distal end 36 of the catching fingers 22a, 22b is limited by the gap 92 therebetween. Additionally, translation of the distal end 36 is further limited by the resilient member 34. The first and second tapered surfaces 94a, 94b, 96a, 96b, along with the gap 92, are able to adjust to accommodate a plurality of fasteners and fastener sizes within the catching fingers 22a, 22b.

Referring now to FIGS. 10 and 11, once the fastener 100b is disposed between the catching fingers 22a, 22b, an operator engages the first trigger button 72, which opens an air valve 81 within the handle 80 and causes the slide device activation member 54 to supply air through air hoses 56 and to the slide device 50. The air then causes the actuator 52 to engage and slide the pivot frame 26 in the direction of arrow D to a position proximate the translating device 60. Once the catching fingers 22a, 22b are positioned proximate the translating device 60 as shown, the operator engages the second trigger button 74, which opens an air valve (not shown) within the handle 80 and causes the translating device activation member 64 to supply air through air hoses 66 and to the translating device 60. The air then causes the actuator 62 to engage the fastener 100b as shown in FIG. 9, which forces the catching fingers 22a, 22b to translate apart and thus the actuator 62 pushes the fastener 100b into a workpiece for installation.

Accordingly, a portable, hand-held device is provided by the fastener catching and installation tool 10 that delivers and inserts fasteners into a workpiece for subsequent operations. The fastener catching and installation tool 10 thus reduces the amount of time for fastener installations over manual methods and improves efficiency in a plurality of manufacturing environments.

The description of the invention is merely exemplary in nature and, thus, variations that do not depart from the substance of the invention are intended to be within the scope of the invention. For example, the catching fingers 22a, 22b are preferably fabricated from a single piece of material, and the gap 92 is formed when the single piece is cut to form the individual catching fingers 22a, 22b. Such variations are not to be regarded as a departure from the spirit and scope of the invention.

What is claimed is:

1. A fastener catching and installation tool comprising:
    a frame defining a proximal end and a distal end;
    a guide tube disposed along the frame;
    a pivot frame disposed at the distal end of the frame;
    a slide device coupled to the pivot frame;
    catching fingers disposed within the pivot frame;
    a translating device disposed along the frame;
    a slide device activation member disposed on the frame and coupled to the slide device; and
    a translating device activation member disposed on the frame and coupled to the translating device,
    wherein when a fastener is delivered through the guide tube and into the catching fingers, the slide device activation member activates the slide device to slide the pivot frame and the catching fingers proximate a workpiece, and the translating device activation member activates the translating device to insert the fastener into the workpiece.

2. The fastener catching and installation tool according to claim 1 further comprising an air supply, wherein the slide device and the translating device are pneumatically operated by the air supply.

3. The fastener catching and installation tool according to claim 2, wherein the slide device and the translating device are air cylinders.

4. The fastener catching and installation tool according to claim 2, wherein the slide device activation member and the translating device activation member are air control valves.

5. The fastener catching and installation tool according to claim 1 further comprising:
    a handle disposed at the proximal end of the frame;
    a first trigger button disposed on the handle that operates the slide device activation member; and
    a second trigger button disposed on the handle that operates the translating device activation member.

6. The fastener catching and installation tool according to claim 1 further comprising a retaining member that maintains positions of the catching fingers.

7. The fastener catching and installation tool according to claim 1, wherein the catching fingers define a tapered bore and opposed slots to properly position and catch a plurality of fastener sizes.

8. A fastener catching and installation tool comprising:
    a frame defining a proximal end and a distal end;
    a guide tube disposed along the frame;
    a pivot frame disposed at the distal end of the frame;
    a slide device coupled to the pivot frame;
    catching fingers disposed within the pivot frame; and
    a translating device disposed along the frame;
    wherein when a fastener is delivered through the guide tube and into the catching fingers, the slide device slides the pivot frame and the catching fingers proximate a workpiece, and the translating device inserts the fastener into the workpiece.

9. The fastener catching and installation tool according to claim 8 further comprising:
    a slide device activation member disposed on the frame that activates the slide device; and
    a translating device activation member disposed on the frame that activates the translating device.

10. The fastener catching and installation tool according to claim 9 further comprising an air supply, wherein the slide device activation member and the translating device activation member are pneumatically operated by the air supply.

11. The fastener catching and installation tool according to claim 10, wherein the slide device activation member and the translating device activation member are air control valves.

12. The fastener catching and installation tool according to claim 10, wherein the slide device and the translating device are air cylinders.

13. The fastener catching and installation tool according to claim 9 further comprising:
    a handle disposed at the proximal end of the frame;
    a first trigger button disposed on the handle that operates the slide device activation member; and
    a second trigger button disposed on the handle that operates the translating device activation member.

14. The fastener catching and installation tool according to claim 8 further comprising a retaining member that maintains positions of the catching fingers.

15. The fastener catching and installation tool according to claim 8, wherein the catching fingers define a tapered bore and opposed slots to properly position and catch a plurality of fastener sizes.

16. A fastener catching device comprising:
    a first catching finger;
    a second catching finger disposed adjacent the first catching finger; and
    at least one retaining member that maintains positions of the first catching finger and the second catching finger relative to each other,
    wherein the device defines a tapered bore and opposed slots to properly position and catch a plurality of fastener sizes.

17. The fastener catching device according to claim 16, wherein the first and second catching fingers are pivotably mounted to an adjacent pivot frame.

18. The fastener catching device according to claim 16, wherein the retaining member is a flexible O-ring.

19. The fastener catching device according to claim 16 further comprising a distal opening defining an oblong shape.

20. A method of positioning and inserting a fastener into a workpiece, the method comprising the steps of:
    (a) delivering a fastener through a guide tube and into catching fingers;
    (b) activating a slide device to slide the catching fingers proximate a workpiece;
    (c) activating a translating device to insert the fastener into the workpiece.

21. The method according to claim 20 further comprising the step of supplying air to activate the slide device and the translating device.

22. The method according to claim 21 further comprising the steps of activating the sliding device and the translating device with an air control valves.

23. The method according to claim 22 further comprising the steps of operating the air control valve for the sliding device with a first trigger and operating the air control valve for the translating device with a second trigger.

24. A method of positioning and inserting a fastener into a workpiece, the method comprising the steps of:

(a) delivering a fastener through a guide tube and into catching fingers;

(b) sliding the catching fingers proximate a workpiece; and (c) translating a rod to insert the fastener into the workpiece.

25. The method according to claim 24 further comprising the step of sliding the catching fingers with a slide device operated by an air supply.

26. The method according to claim 25 further comprising the step of activating the slide device with an air control valve.

27. The method according to claim 26 further comprising the step of operating the air control valve with a first trigger.

28. The method according to claim 24 further comprising the step of translating the rod with a translating device operated by an air supply.

29. The method according to claim 28 further comprising the step of activating the translating device with an air control valve.

30. The method according to claim 29 further comprising the step of operating the air control valve with a second trigger.

31. A method of catching a fastener from an automated fastener delivery system, the method comprising the steps of:

(a) delivering a fastener into a tapered bore of catching fingers;

(b) guiding the fastener through the catching fingers with the tapered bore; and (c) catching the fastener against distal internal shoulders of the catching fingers.

32. The method according to claim 31 further comprising the steps of pivoting the catching fingers to guide the fastener through the tapered bore.

33. The method according to claim 31 further comprising the step of resiliently retaining the catching fingers relative to one another.

* * * * *